United States Patent [19]
Clavenna et al.

[11] Patent Number: 5,356,845
[45] Date of Patent: Oct. 18, 1994

[54] PROCESS FOR THE REACTIVATION OF NICKEL-ALUMINA CATALYSTS

[75] Inventors: LeRoy R. Clavenna; Stephen M. Davis; Brent E. Beasley, all of Baton Rouge, La.

[73] Assignee: Exxon Research and Engineering Company, Florham Park, N.J.

[21] Appl. No.: 60,333

[22] Filed: May 11, 1993

[51] Int. Cl.$^5$ .................. B01J 38/72; B01J 21/20; B01J 23/94; C10J 3/46
[52] U.S. Cl. ...................... 502/21; 48/198.7; 48/214 A; 502/27; 502/28; 502/38; 502/516
[58] Field of Search ............ 502/27, 28, 38, 516, 502/21; 48/198.7, 214 A

[56] References Cited
U.S. PATENT DOCUMENTS

| | | | |
|---|---|---|---|
| 2,380,731 | 7/1945 | Drake et al. | 502/28 |
| 3,186,957 | 6/1965 | Stiles | 48/214 A |
| 3,342,751 | 9/1967 | Hayes | 48/198.7 |
| 4,042,532 | 8/1977 | McArthur | 502/335 |
| 4,191,664 | 3/1980 | McArthur | 502/335 |
| 4,456,703 | 6/1984 | Aldridge | 502/335 |
| 4,522,928 | 6/1985 | McVicker et al. | 502/516 |

Primary Examiner—Paul E. Konopka
Attorney, Agent, or Firm—Jay Simon

[57] ABSTRACT

A process for the reactivation, or rejuvenation of a nickel-alumina catalyst employed in the production of a gas comprised of an admixture of hydrogen and carbon monoxide, or synthesis gas, by the conversion, in a reactor, or reaction zone, of light hydrocarbons in a fluidized bed of the catalyst at elevated temperature, in the presence of steam and oxygen. Catalyst reactivation is accomplished by withdrawing a portion of the catalyst from the fluidized bed of the reactor and treating the catalyst in an oxidation zone at temperature sufficient to oxidize and convert the nickel component of the catalyst to nickel aluminate and disperse said nickel aluminate within the alumina support, and then recycling the treated catalyst to the reactor, or reaction zone, to reactivate and increase the activity of the catalyst. The catalyst, on reduction in the reactor, or reaction zone, is provided an additional boost in activity by washing, treating or contacting the catalyst from the elevated temperature oxidation zone with an acid sufficient to remove trace impurities without removing any substantial amount of the nickel aluminate, and without forming a residue on the catalyst surface. The normal tendency of the catalyst to agglomerate at reaction conditions is also reduced by the acid treatment.

22 Claims, 2 Drawing Sheets

5,356,845

PROCESS FOR THE REACTIVATION OF NICKEL-ALUMINA CATALYSTS

FIELD OF THE INVENTION

This invention relates to a process for the reactivation of nickel-alumina catalysts. In particular, it relates to the reactivation of nickel-on-alpha alumina catalysts employed in a fluidized bed operation wherein a light hydrocarbon feed is converted to hydrogen and carbon monoxide in the presence of steam and oxygen.

BACKGROUND

The production of synthesis gas, or syn gas (carbon monoxide and hydrogen) via the reaction of low molecular weight hydrocarbons, primarily methane, within a fluidized bed of catalyst in the presence of steam (steam reforming process) or oxygen (partial oxidation process) is well known. Processes wherein the light hydrocarbons are converted to syn gas within a fluidized bed of catalyst, e.g., nickel on an alpha alumina support, at elevated temperatures in the presence of both steam and oxygen (air) are also well known, and this type of process may offer particular advantages in that the molar ratio of hydrogen and carbon monoxide can be better controlled to produce a gas particularly suitable for conducting Fischer-Tropsch reactions. In conducting Fischer-Tropsch operations, it is required that the molar ratio of the hydrogen:carbon monoxide used be maintained at about 2:1.

Fluidized bed processes offer particular advantages in that they provide superior heat and mass transfer characteristics as contrasted with fixed bed processes. Fluidized processes permit substantially isothermal reactor conditions in conducting both exothermic and endothermic reactions. However, there are certain problems inherent in fluidized bed operations, notable among which is the sensitivity of the process to changes in the catalyst produced during the operation. Agglomeration and sintering of the solid catalytic particles during high temperature reactions and/or the introduction of contaminating substances into the catalyst by the feed reduces the activity of the catalyst.

During the reaction the catalytic metal component, i.e., nickel, grows in crystallite size. The alumina particles also agglomerate to adversely affect the fluidization characteristics of the bed, and the activity of the catalyst declines. Contaminants, introduced into the fluidized bed, eliminate or shield catalyst sites with further reduction of catalytic activity. Relatively high methane in the syn gas product and the decline in catalyst activity during normal operations seriously debits the process, and sooner or later the deactivated catalyst must be regenerated or replaced by fresh catalyst.

DESCRIPTION OF THE INVENTION

The present invention relates to a process for the reactivation, or rejuvenation, of a nickel-on-alumina catalyst, particularly a contaminated nickel-on-alumina catalyst. In the process a portion of the nickel-on-alumina catalyst is withdrawn from a reactor, or reaction zone, containing a fluidized bed of the catalyst within which a mixture of hydrogen and carbon monoxide is produced by contact with the catalyst bed at elevated temperature, in the presence of steam and oxygen at net reducing conditions, and the catalyst contacted with an oxidizing-gas at temperature elevated sufficiently to convert the nickel component of the catalyst to nickel aluminate, and disperse the nickel aluminate within the alumina support, without significantly sintering or agglomerating the support. The nickel aluminate component of the catalyst, on recycle of the catalyst to the reactor, or reaction zone, will be reduced and the activity of the catalyst will be increased vis-a-vis that of the catalyst initially withdrawn from the reactor, or reaction zone.

In a preferred method of operation, the catalyst is classified according to particle size distributions, e.g., by elutriation from a fluidized bed, with or without the use of one or more cyclone separators, located above the bed, via the use of one or a series of cyclone separators used with a collection vessel, or by sieve separation means, and a preselected portion of the catalyst particles is withdrawn from the reactor, or reaction zone, and treated. The non-selected portion, or portions, of catalyst can be recycled, or discarded, as determined by process economics.

In a particularly preferred embodiment, an additional activity boost is provided to a contaminated nickel-on-alumina catalyst after oxidation of the nickel component of the catalyst with an oxygen-containing gas at elevated temperature to form nickel aluminate by treatment of the catalyst with an acid solution to remove contaminant surface impurities, without dissolving the nickel aluminate, prior to recycle of the catalyst to the reactor, or reaction zone. The oxidation treatment with an oxygen-containing gas thus increases the activity of the catalyst, on reduction, to a level above that of the catalyst initially withdrawn from the reactor, or reaction zone. The treatment with the acid solution further increases the activity of the catalyst, on reduction, to an even higher level; viz. to a level greater than that of the catalyst subjected to the oxidation treatment, and reduced. The activity of a nickel-on-alumina catalyst subjected to both the oxidation and acid treatments more closely approaches that of the fresh catalyst. Moreover, as a result of the decrease in the level of surface contaminants resultant from the acid treatment, the catalyst has less tendency to agglomerate when recycled to the bed of the syn gas reactor, or reaction zone.

This invention, and its principle of operation, will be more fully understood by reference to the following detailed description of specific and preferred embodiments, and to the attached drawings to which reference is made in the description. In the different views, identical numbers are used to designate corresponding parts, or components.

REFERENCE TO THE DRAWINGS

FIG. 1 graphically depicts, in flow diagram format, a preferred process for the practice of this invention. In this figure, the numeral 10 refers to the syn gas reactor, the numeral 20 refers to the high temperature oxidation zone wherein catalyst from the reactor is treated to obtain a first activity boost, and numeral 30 refers to a preferred catalyst size classification zone wherein catalyst withdrawn from the reactor can be classified in optimal particle size distributions for treatment. The whole of the catalyst, or catalyst of optimum particle size distribution, after oxidation treatment, is treated in said acid treat zone 40 to provide an additional activity boost. The numeral 50 refers to a catalyst filtration and drying zone.

FIGS. 2–4 schematically depict preferred catalyst classification means: FIG. 2 depicting particle size classification via use of an elutriating fluid bed with internal cyclones; FIG. 3 depicting classification of the particles based only on cyclone separators; and FIG. 4 depicting particle size classification via sieve separation.

DETAILED DESCRIPTION OF THE INVENTION

Figure 1:
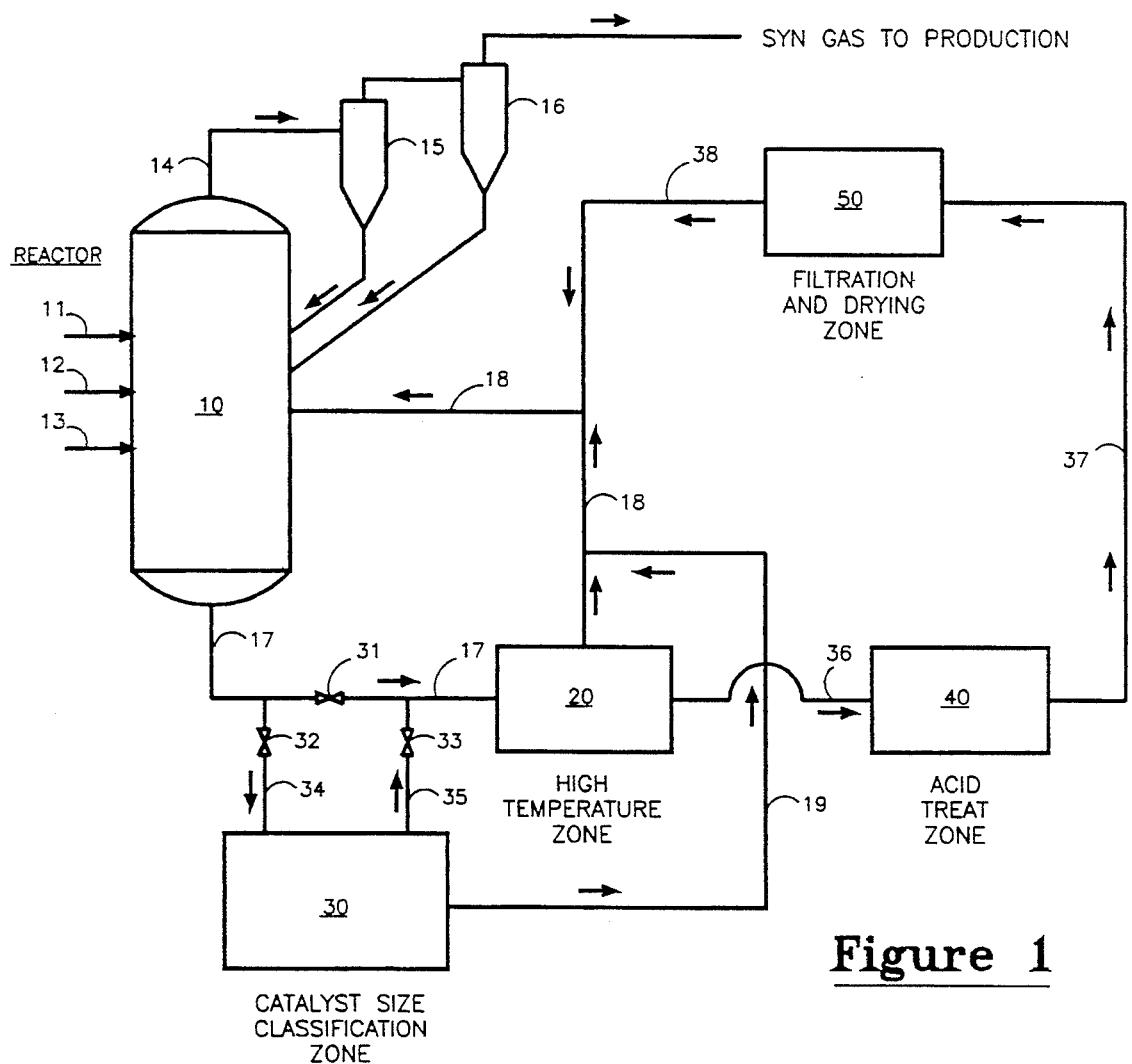

Referring first to FIG. 1, synthesis gas is produced in fluidized bed reactor 10. Preheated light hydrocarbons, $C_1$–$C_4$ alkanes, predominantly methane, steam and oxygen or an oxygen-containing gas (air), are fed into reactor 10 via lines 11, 12, 13, respectively, and reacted within a fluidized bed of nickel-alpha alumina catalyst at temperatures above about 1500° F. (816° C.), preferably at temperatures ranging from about 1700° F. (927° C.) to about 1900° F. (1038° C.), sufficient to convert the hydrocarbon feed to hydrogen and carbon monoxide, or syn gas, without significant disintegration of the catalyst to fines, or catalyst agglomeration. Pressures range generally from about atmospheric to about 40 atmospheres, preferably from about 20 atmospheres to about 30 atmospheres where a 2:1 molar ratio of hydrogen:carbon monoxide is desirable for the production of Fischer-Tropsch synthesis gas, and the avoidance of interstage compression.

The catalyst of the fluidized bed is one which contains generally from about 1 percent to about 20 percent nickel, preferably from about 5 percent to about 10 percent nickel, composited with an alpha alumina support, based on the total weight of the catalyst. The fluidized bed may also contain, and generally does contain a particulate solids diluent to disperse heat, suitably high purity alpha alumina. Generally, the bed is constituted of from about 10 percent to about 99.9 percent, preferably from about 80 percent to about 99.5 percent, of the solid diluents component and from about 0.1 percent to about 90 percent, preferably from about 0.5 percent to about 20 percent, of the catalyst, based on the total weight of the particulate solids constituting the fluidized bed. A hydrogen and carbon monoxide product, steam, some unconverted hydrocarbons and other materials exit overhead line 14, cyclone separators 15, 16 trapping some of the catalyst particles and fines, returning them via their respective diplegs to the reactor. The mean average diameter of the particles constituting the fluidized bed generally ranges from about 30 microns to about 150 microns, the key fluidization characteristics determined by particle size distribution, e.g., bubble size, fluidization regime, being well known and understood by those skilled in this art.

In the initial step of reactivating, or regenerating, the catalyst a portion of the catalyst is withdrawn from the bottom of reactor 10 via line 17 and contacted in catalyst oxidation zone 20 with oxygen, or an oxygen-containing gas, preferably air, at temperature elevated sufficiently to convert the nickel or nickel oxide surface component, or components, of the catalyst to nickel aluminate and disperse said nickel aluminate component within the alumina support. Suitably, the catalyst is contacted with the oxidizing gas, e.g., air, at a temperature above about 1300° F. (714° C.), preferably at temperatures ranging from about 1300° F. (714° C.) to about 2400° F. (1315° C.), more preferably from about 1600° F. (871° C.) to about 2000° F. (1093° C.), for a period sufficient to convert the nickel, or nickel oxide component, to nickel aluminate without sintering the catalyst. Generally, at temperatures ranging from about 1600° F. (871° C.) to about 2000° F. (1093° C.) from about 0.1 hour to about 20 hours, or most often from about 0.5 hour to about 16 hours, are adequate to restructure, disperse and convert the nickel, or nickel oxide component of the catalyst to nickel aluminate. On withdrawal of the oxidized catalyst from oxidation zone 20, and recycle thereof via line 18 to the reactor 10, the nickel alumina component of the catalyst is reduced in the reducing atmosphere of the reactor to metallic nickel and the catalyst thereby reactivated, or rejuvenated.

Optionally, continuing the reference to FIG. 1, instead of treating the whole of the catalyst withdrawn from reactor 10, the catalyst can be classified according to size in catalyst size classification zone 30 to reduce the quantity of the catalyst treated. This is advantageous because the nickel tends to concentrate in the coarse fraction, or fraction wherein the average particle size diameters are greater than about 90 microns. Suitably, a coarse fraction of average particle size diameters ranging between about 90 microns and 200 microns is selected for treatment. Thus, in a preferred embodiment only a selected portion of the catalyst withdrawn from the reactor 10 is treated in high temperature oxidation zone 20, while another portion, or portions, of the withdrawn solids is recycled without treatment via line 19 to the reactor 10. The classification of the withdrawn catalyst particles can be performed in various ways, suitably by elutriation from a fluidized bed, with or without the use of one or a series of cyclone separators located above the bed, via the use of one or a series of cyclone separators mounted above a vessel that collects the coarse fraction of the catalytic solids, or via sieve separations as represented via "block 30" in FIG. 1. Thus, with valve 31 closed, and valves 32, 33 open, the whole of the catalyst withdrawn from reactor 10 via line 17 can be passed into catalyst classification zone 30 via line 34. The desired portion of catalyst can then be separated therefrom in zone 30, and then introduced via lines 35, 17 to the high temperature oxidation zone 20. The residual, or non-selected portion of the catalyst can then be directly recycled via line 19 to the reactor 10.

Figure 2:
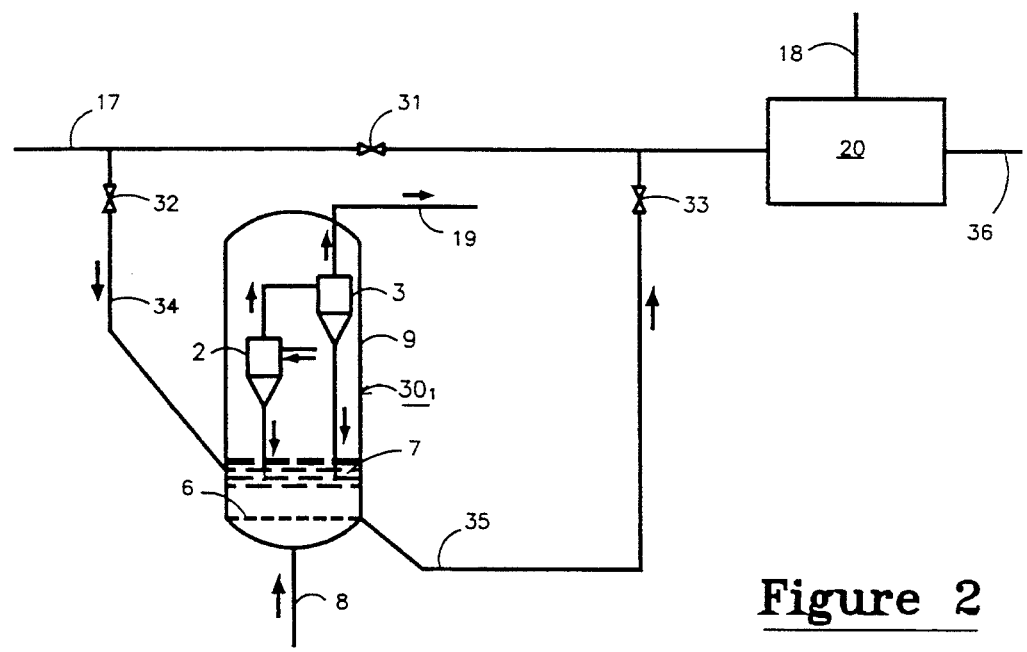

Referring specifically to FIG. 2 there is schematically depicted a fluid bed elutriator $30_1$, or classifier which utilizes a vessel 9 which contains a pair of internal cyclones 2, 3 for selection of catalyst particles of desired size distributions for subsequent treatment. The cyclones 2, 3 are located within and above a fluidized bed 7 of the catalyst, and the latter is supported atop a grid 6. Fines particles are removed from the cyclones 2, 3 via line 19 located at the top of the vessel, and coarser particles are returned to the fluidized bed 7 via the diplegs of the cyclones. A slipstream of catalytic solids withdrawn via line 17 from the reactor 10, is thus fed via valved line 34 into the vessel 9 into the bottom of which heated gas, e.g., steam or air or both is introduced via line 8 to stratify the catalytic particles according to size, the coarser particles stratifying in the bottom portion of the fluidized bed, above the grid 6 near the bottom of the vessel. The coarser particles of preselected size are withdrawn from the bed via valved line 35 and fed, via line 17, into the high temperature oxidation zone 20. Fines particles are withdrawn from the vessel $30_1$ via line 19 and recycled to the reactor, or further classified according to preselected particle size distributions via means not shown.

Figure 3:
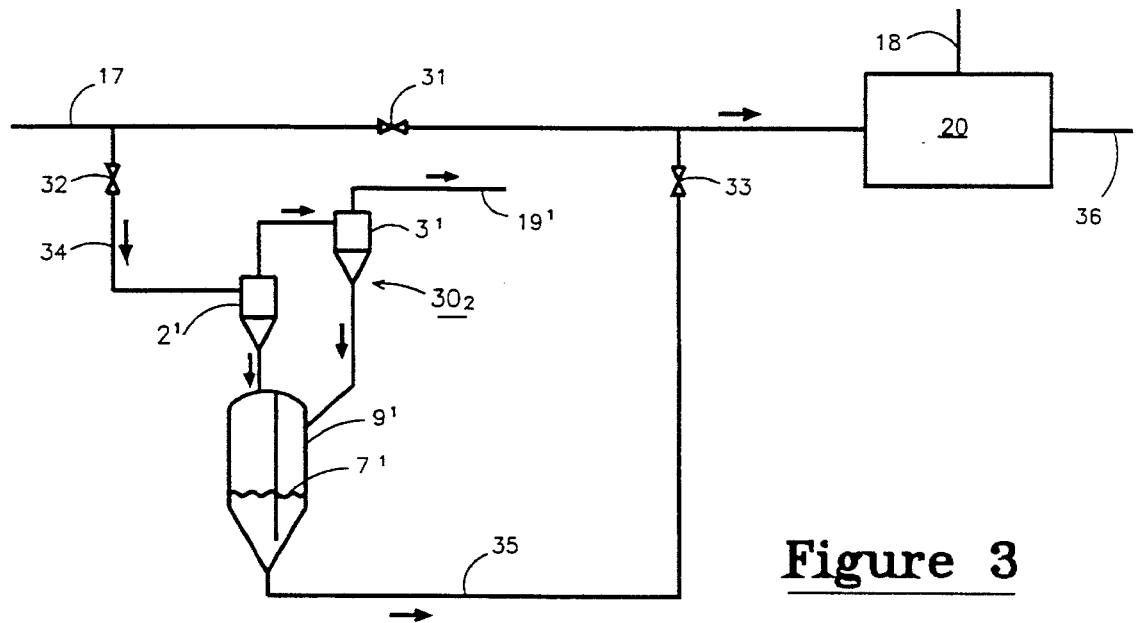

Reference is now made to FIG. 3 which schematically depicts a cyclone (centrifugal) classification system $30_2$ wherein cyclones $2^1$, $3^1$ are serially mounted externally and above the vessel 9¹ within the bottom of which is contained a bed 7¹ of catalytic solids particles. In the operation of this cyclone classification system, the slipstream of catalytic solids withdrawn via line 17 from the reactor 10 is thus fed via line 34 into the first cyclone 2¹ of the series, fines solids particles ascending and entering onto the top of the second cyclone 3¹ of the series, exiting via line 19¹. The coarser particles pass downwardly through the two diplegs of the cyclones, respectively, and enter into the bed 7¹ of the vessel 9¹. A coarse particulate solids fraction of preselected size is withdrawn via line 35 and fed, via line 17 into the high temperature oxidation zone 20.

Figure 4:
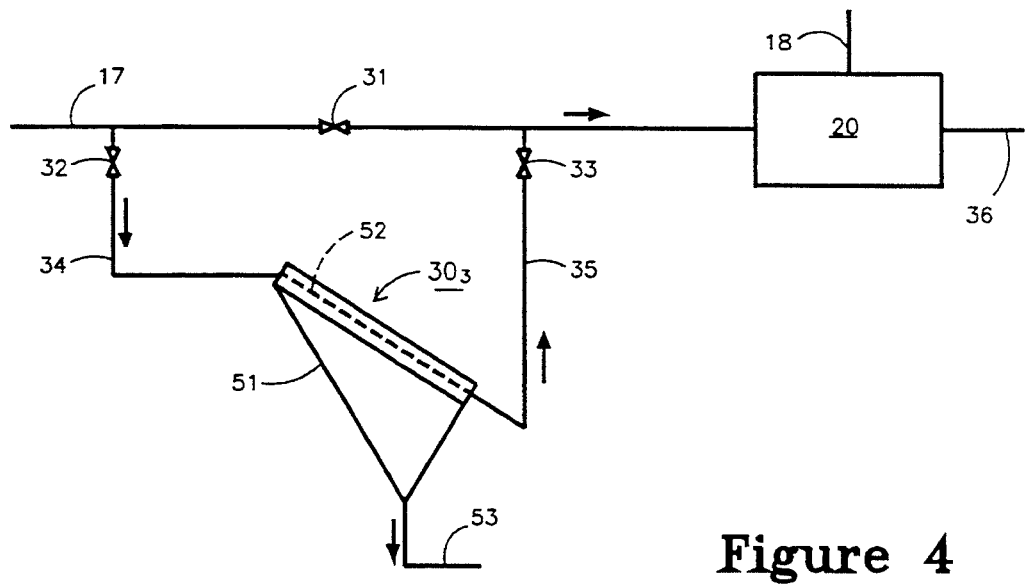

Referring to FIG. 4, there is also depicted a screen sieve classification system 30₃ which can also be employed for separation of a coarse particulate catalyst fraction from fines solids particles. In this figure, there is thus illustrated a trough shaped container, or vessel 51 across the upper side of which is located a sieve screen 52. Solids particles withdrawn from the reactor are thus fed via line 34 atop the screen 52, of preselected mesh size. Fines are passed through the screen 52 to enter into the vessel 51 from where they are removed via line .53. The coarser solids particles, which cannot pass through the screen 52, are passed via line 35 to the high temperature oxidation zone 20.

Treatment of the catalyst via high temperature oxidation in zone 20, and subsequent reduction of the catalyst in the reactor 10 provides a substantial catalyst activity boost. There are a number of sources from which the catalyst can become contaminated, e.g., from the feed during the reaction, the reactor or reactor system, the carrier for the catalyst itself, or the solids diluent used to disperse heat. Hence, the catalyst almost invariably contains metal contaminants, such as alkali metals, e.g., sodium, potassium, and the like, or other metals, e.g., iron, and the like, or non metal contaminants, e.g., silicon, and the like, which suppresses the activity of the catalyst sufficiently that treatment in oxidation zone 20 does not fully restore the activity of the catalyst. Removal of these contaminants after treatment in oxidation zone 20, can provide a second, additional catalyst activity boost on return of the catalyst to reactor 10. Some of these contaminants also increase the tendency of the catalyst to agglomerate; and hence their removal is also helpful in suppressing this tendency. Consequently, after treatment of the catalyst in oxidation zone 20 the catalyst is preferably contacted, or washed with an acid sufficient to dissolve and remove the contaminants from the catalyst without dissolving significant amounts of the nickel aluminates. The acid used must preferably also be one which will not form a residue, or introduce other contaminants.

Acids suitable for dissolving out the impurities without significant reaction with the nickel aluminate, or formation of a residue, are certain of the mineral acids, exemplary of which are nitric acid, nitrous acid, and the like, carboxylic acids, e.g., formic acid, acetic acid, citric acid, and the like, polycarboxylic acids, e.g., oxalic acid and the like, hydroxycarboxylic acids, e.g., lactic acid, and the like, fluorosubstituted carboxylic acids, e.g., trifluoroacetic acid and the like, amino acids, e.g., ethylenediaminotetracetic acid (EDTA) and the like, sulfonic acids and substituted sulfonic acids, e.g., trifluoromethanesulfonic acid and the like. Acids containing anionic or free halides, e.g., HCl, are generally to be avoided. Suitably, the acids are used in aqueous solutions in concentrations providing from about 0.01 molar to about 1.0 molar, preferably from about 0.03 molar to about 0.1 molar, solutions. Referring again to FIG. 1, catalyst withdrawn from oxidation zone 20 is thus passed via line 36 to a quench zone (not shown) wherein the catalyst is contacted with water to reduce the temperature of the catalyst to about ambient temperatures, and the catalyst then transported to acid treat zone 40.

In acid treat zone 40 the catalyst is contacted with a dilute concentration of the acid for time sufficient to remove a substantial portion of the surface contaminants without reacting with and dissolving a significant amount of the nickel aluminate, and without forming a residue. Generally, treatment of the catalyst with a dilute aqueous acid solution, e.g., a 0.1 molar nitric acid solution, over a period ranging from about 0.01 hour to about 2 hours, preferably from about 0.05 hour to about 0.5 hour, will remove a major part of the surface contaminants without reaction with the nickel aluminate component of the catalyst, and without formation of a residue. The acid treated catalyst is then removed from acid treat zone 40 via line 37 and introduced into filtration and drying zone 50. Within filtration and drying zone 50 the catalyst is separated from the acid solution, washed with water, suitably by filtration, hydroclone, or continuous centrifugation, and the wet catalyst then dried, e.g., on a belt fed dryer, spray dryer, fluid bed dryer or the like. The dry catalyst is withdrawn from filtration and drying zone 50 and passed via lines 38, 18 to reactor 10.

The invention will be better understood via the following illustrative examples, which serve to demonstrate specific and preferred embodiments.

EXAMPLE 1

A feed gas admixture in molar ratio of methane:-water:oxygen of 1.0:0.5:0.5 is fed into a reactor employing a fluidized bed of nickel-on-alpha alumina catalyst, the nickel being dispersed on the catalyst in concentration of 8 percent nickel, measured as metallic nickel based on the weight of the catalyst. The catalyst is diluted with alpha alumina heat transfer solids particles such that the metallic nickel concentration, based on the weight of the bed, is about 0.3 weight percent. The reaction is conducted in a pilot plant unit at a nominal temperature of 1800° F. (983° C.) and 360 psia to produce a synthesis gas containing approximately 2.72 mole % unreacted methane, 55.78 mole % hydrogen, 23.71 mole % carbon monoxide, 3.69 mole % carbon dioxide, and 14.10 mole % water.

After several days of operation, a slipstream withdrawn from the bottom of the reactor contains catalyst of average size diameter particle size distribution as follows:

| | |
|---|---|
| >90 microns | 9 wt. % |
| 75/90 microns | 20 wt. % |
| 63/75 microns | 31 wt. % |
| 53/63 microns | 24 wt. % |
| 38/53 | 14 wt. % |
| <38 microns | 2 wt. % |

A portion of the catalyst of size diameters greater than 90 microns is fed into a high temperature oxidation zone wherein the catalyst is contacted with air at 1800° F. (983° C.), at contact time sufficient to convert essentially all of the nickel component of the catalyst to nickel aluminate.

When a spent portion of catalyst is oxidized in this manner, and again employed in a reactor to convert the feed to syn gas it is found that the activity of the catalyst can be increased generally by an amount ranging from at least about 20% to 100%, based on the activity of the catalyst as withdrawn from the reactor. The following Examples 2 and 3 are exemplary of spent catalysts taken from a large pilot plant unit and oxidized, and reactivated, at different sets of conditions to provide increased activities ranging from about 24% to 96% vis-a-vis the deactivated catalysts.

EXAMPLE 2

This example demonstrates the reactivation of a spent catalyst by high temperature oxidation. The catalyst employed in conducting these runs was a sample of bed material from a large synthesis gas pilot unit. The activity of the catalyst was measured in a fixed bed laboratory reactor system, a ceramic lined reactor designed to avoid mass and heat transfer limitations and provided with a rapid quench to avoid back reactions. Measurements were taken at 1800° F. (983° C.) and nominally 360 psia with a feed mixture of $CH_4:CO:H_2:H_2O$ equal to 1:1:1:2 and with a gas residence time of about 80 msec. The activity of the spent catalyst and this catalyst reactivated by air oxidation at 1400° F. (760° C.) for 16 hours (Reactivation 1) and 1800° F. (983° C.) for 16 hours (Reactivation 2) are shown in Table 1.

TABLE 1

| | Catalyst Reactivated by Oxidation | | |
|---|---|---|---|
| Catalyst Sample | Oxidation Temperature, °F. | Activity at 40 hrs, 1/sec | Activity Increase, % |
| Spent Catalyst | (Base Case) | 4.6 | (Base Case) |
| Reactivation 1 | 1400 (760° C.) | 5.7 | 24 |
| Reactivation 2 | 1800 (983° C.) | 9.0 | 96 |

Thus, as shown by the data, Reactivation 1 (1400° F.) gave an activity increase of 24% and Reactivation 2 (1800° F.) gave an activity increase of 96%.

EXAMPLE 3

This example also shows the reactivation of a spent catalyst by high temperature oxidation. The catalyst is a sample of bed material from a large synthesis gas pilot unit but from a different time period from that used in Example 2. The steam reforming activity was measured in the laboratory reactor system described in Example 2. The activities of the spent catalyst and the catalyst reactivated by air oxidation at 1600° F. for 3 hours are shown in Table 2.

TABLE 2

| | Catalyst Reactivated by Oxidation | | |
|---|---|---|---|
| Catalyst Sample | Oxidation Temp./Time | Activity at 40 Hrs, 1/Sec | Atactivity Increase, % |
| Spent Catalyst | (Base Case) | 13.2 | (Base Case) |
| Reactivated | 1600° F./3 Hrs | 17.1 | 30 |

Thus, as demonstrated, the reactivation at 1600° F. (871° C.) for 3 hours gave an activity increase of 30%.

The following exemplify the effect of acid washing to reduce the tendency of the catalytic particles to agglomerate due to the presence of surface contamination.

EXAMPLE 4

Samples of a tabular alumina with a particle size range of 45–106 μm (150/325 mesh) were treated with dilute nitric acid solutions in variable concentration. The experiments were conducted by slurrying about 25 grams of the alumina powder in 200 cc of acid solution at room temperature for a period of 20 to 30 minutes using a magnetic stirrer to provide continuous agitation. After acid treatment, the alumina samples were collected in a small Buchner funnel and briefly rinsed with about 30–50 cc of deionized water. A control experiment was also carried out using water in place of nitric acid. After filtration, the alumina samples were dried at room temperature and then dried overnight in a vacuum oven maintained at 100° C.

The acid washed materials were tested for agglomeration resistance in a small fixed bed sintering test that has been developed to assess the agglomeration resistance of particulate oxides in fluid bed syn gas generation. In this test, an 8–10 gram sample of the particulate oxide was distributed in a small Coors alumina boat. The sample was placed in a high temperature Lindberg furnace and heated from room temperature to 1600° C. over a period of about 90 minutes. The sample was then held at 1600° C. for a period of 2 hours to induce thermal sintering and agglomeration. The sample was then cooled to about 100° C. over a period of 6–12 hours and removed from the oven. The sample was then transferred to a sonic sieve operated at a constant power level, and the conversion of 45 to 106 μm particles to fused aggregates greater than 106 μm in size was determined by weighing the fractions collected on a 150 mesh size screen.

Table 3 compares agglomeration results for the tabular alumina materials treated with nitric acid at variable concentrations. It is easily seen that very dilute, 0.001M nitric acid and/or washing with deionized water had little or no measurable impact on agglomeration resistance. However, treatment with more concentrated nitric acid solutions resulted in significant improvements in agglomeration resistance. Samples treated with acid concentrations in the range of 0.1 to 0.5M showed noticably reduced agglomeration.

TABLE 3

| Agglomeration Test Data and Surface Composition Results for Acid Treated Tabular Alumina | | | | | |
|---|---|---|---|---|---|
| | Agglomeration at 1600° C. | XPS Atomic Ratios | | | |
| Acid Washing Conditions | (% + 106 μm) | (NaAal) | (Ca/Al) | (Si/Al) | (B/Al) |
| None (Unwashed Standard) | 47 | 0.10 | 0.012 | 0.034 | 0.046 |
| None (Water Washed Blank) | 44 | 0.12 | 0.012 | 0.034 | 0.051 |
| 0.001 M $HNO_3$ | 59 | 0.077 | 0.014 | 0.035 | 0.040 |
| 0.01 M $HNO_3$ | 16 | 0.059 | 0.009 | 0.021 | 0.035 |
| 0.1 M $HNO_3$ | 14 | 0.039 | 0.009 | 0.020 | 0.032 |

TABLE 3-continued

Agglomeration Test Data and Surface Composition Results for Acid Treated Tabular Alumina

| Acid Washing Conditions | Agglomeration at 1600° C. (% + 106 μm) | XPS Atomic Ratios | | | |
| --- | --- | --- | --- | --- | --- |
| | | (NaAal) | (Ca/Al) | (Si/Al) | (B/Al) |
| 0.5 M HNO$_3$ | 11 | 0.014 | 0.009 | 0.016 | 0.009 |

EXAMPLE 5

The surface composition of the materials considered in Example 4 was investigated using X-ray photoelectron spectroscopy in a conventional instrument manufactured by Leybold-Heraeus that employs an Al-anode X-ray source. The surface atomic ratios of various impurity elements relative to aluminum were calculated by correcting the measured boron(1s) silicon(2s), sodium(1s), calcium(2p), and aluminum(2s) XPS peak areas with Scofield photoionization cross sections. Table 3 includes these atomic ratios for the materials studied. It can easily be seen that the acid washed materials with improved agglomeration resistance displayed reduced surface concentrations of impurity species. Boron, calcium, silicon, and sodium, in particular, were reduced to low levels after treatment with 0.1–0.5M nitric acid.

EXAMPLE 6

This example shows the reactivation of a spent catalyst by high temperature oxidation followed by an acid wash. The catalyst is a sample of bed material from a large synthesis gas pilot unit but from a different time period from that used in Examples 2 and 3. The steam reforming activity was measured in the laboratory reactor system described in Example 2. Table 4 shows the activities of the spent catalyst, the catalyst reactivated by air oxidation at 1800° F. (983° C.) for 16 hours and the catalyst reactivated by the oxidation followed by an acid wash in either 0.1M (molar) or 1.0M nitric acid for 20 minutes.

TABLE 4

Catalyst Reactivation by Oxidation Plus Acid Wash

| Catalyst Sample | Oxidation Temperature/Time | Acid Wash Conc./Time | Activity at 40 Hrs, 1/Sec | Activity Increase, % |
| --- | --- | --- | --- | --- |
| Spent Catalyst | (Base Case) | — | 16.4 | (Base Case) |
| Oxidation | 1800° F./16 Hrs | — | 23.5 | 43 |
| Oxid. + Acid Wash | 1800° F./16 Hrs | 0.1 M/20 Min | 28.3 | 73 |
| Oxid. + Acid Wash | 1800° F./16 Hrs | 1.0 M/20 Min | 31.1 | 90 |

As shown in Table 4, the reactivation by air oxidation gave an activity increase of 43%, and the oxidation followed by an acid wash gave an additional activity increase to 73 with the 0.1M nitric acid wash and an additional activity increase to 90% with the 1.0M nitric acid wash.

It is apparent that various modifications and changes can be made without departing from the spirit and scope of the invention.

Having described the invention, what is claimed is:

1. In a process for the production of hydrogen and carbon monoxide from a low molecular weight hydrocarbon by contact with a fluidized bed of nickel-on-alumina catalyst at elevated temperature in the presence of steam and oxygen, in a reaction zone operated in a net reducing atmosphere, the steps comprising withdrawing a portion of said catalyst and contacting said catalyst with an oxygen-containing gas at a temperature elevated sufficiently to convert the nickel component of said catalyst to nickel aluminate, and disperse said nickel aluminate within the alumina support, without sintering said alumina support, and recycling said catalyst after contact with the oxygen-containing gas to the reaction zone to reduce the nickel aluminate component of the catalyst, and increase the activity of the catalyst vis-a-vis that of the catalyst initially withdrawn from the reaction zone.

2. The process of claim 1 wherein the nickel-on-alumina catalyst withdrawn from the reaction zone is contacted with air at temperature above about 1300° F. to oxidize said nickel component to nickel aluminate, and disperse the nickel aluminate on the surface of the alumina support.

3. The process of claim 2 wherein the temperature of treatment ranges from about 1300° F. to about 2400° F.

4. The process of claim 3 wherein the temperature of treatment ranges from about 1600° F. to about 2000° F.

5. The process of claim 1 wherein the nickel-on-alumina catalyst withdrawn from the reaction zone is classified according to size and divided into portions, and a portion thereof is treated by contact with the oxygen-containing gas to form and disperse said nickel aluminate within the support, and said treated portion is then recycled to the reaction zone.

6. The process of claim 1 wherein the portion of catalyst that is withdrawn from the reaction zone contains contaminants and the contaminated catalyst is treated by contact with the oxygen-containing gas to convert the nickel component to nickel aluminate and disperse the nickel aluminate, there is provided an additional step wherein the catalyst is contacted with an acid solution sufficient to dissolve and remove contaminants from the surface of the catalyst, without dissolving the nickel aluminate, prior to recycle of the catalyst to the reaction zone, thus decreasing the tendency of the catalyst to agglomerate on recycle of the catalyst to the reaction zone as well as further increasing the activity of the catalyst vis-a-vis that of the catalyst treated by contact with the oxygen-containing gas and recycled to the reaction zone.

7. The process of claim 6 wherein the acid contacted with the catalyst to dissolve and remove contaminants from the surface of the catalyst does not form a residue.

8. The process of claim 6 wherein the acid contacted with the catalyst to dissolve and remove contaminants from the surface of the catalyst is selected from the group consisting of nitric acid, nitrous acid, carboxylic acids, inclusive of polycarboxylic acids, hydroxycarboxylic acids, fluorocarboxylic acids and the like, ethylenediaminotetracetic acid, sulfonic acids and the like.

9. The process of claim 6 wherein the acid solutions are of concentrations ranging from about 0.01 molar to about 1.0 molar.

10. The process of claim 7 wherein the catalyst, after treatment with the acid solution, is separated from the acid solution and dried.

11. In a process for the production of hydrogen and carbon monoxide from a low molecular weight hydrocarbon by contact with a fluidized bed of contaminated nickel-on-alumina catalyst at elevated temperature in the presence of steam and oxygen, in a reaction zone operated in a net reducing atmosphere, the steps comprising withdrawing a portion of said catalyst and contacting said catalyst with an oxygen-containing gas at temperature elevated sufficiently to convert the nickel component of said catalyst to nickel aluminate, and disperse said nickel aluminate within the alumina support, without sintering said alumina support, contacting said catalyst, after contact with said oxygen-containing gas, with an acid solution sufficient to dissolve and remove contaminants from the surface of the catalyst without dissolving the nickel aluminate, and recycling said catalyst to the reaction zone to reduce the nickel aluminate component of the catalyst, increase the activity of the catalyst, and lessen the tendency of the catalyst to agglomerate on recycle to the reaction zone.

12. The process of claim 11 wherein the nickel-on-alumina catalyst withdrawn from the reaction zone is contacted with air at a temperature above about 1300° F. to oxidize said nickel component to nickel aluminate, and disperse the nickel aluminate on the surface of the alumina support.

13. The process of claim 12 wherein the temperature of treatment ranges from about 1300° F. to about 2400° F.

14. The process of claim 13 wherein the temperature of treatment ranges from about 1600° F. to about 2000° F.

15. The process of claim 11 wherein the acid contacted with the catalyst to dissolve and remove metal contaminants from the surface of the catalyst is selected from the group consisting of nitric acid, nitrous acid, carboxylic acids, inclusive of polycarboxylic acids, hydroxycarboxylic acids, fluorocarboxylic acids and the like, ethylenediaminotetracetic acid, sulfonic acids, and the like.

16. The process of claim 11 wherein the acid solutions are of concentrations ranging from about 0.01 molar to about 1.0 molar.

17. The process of claim 11 wherein the catalyst, after treatment with the acid solution, is separated from the acid solution, dried, and then recycled to the reaction zone.

18. In a process for the production of hydrogen and carbon monoxide from a low molecular weight hydrocarbon by contact with a fluidized bed of nickel-on-alumina catalyst at elevated temperature in the presence of steam and oxygen, in a reaction zone operated in a net reducing atmosphere, the steps comprising withdrawing a portion of said nickel-on-alumina catalyst from the reaction zone and classifying the catalyst in fractions according to size, including a coarse fraction wherein the average particle size diameters are greater than about 90 microns, contacting said coarse fraction of catalyst with an oxygen-containing gas at a temperature elevated sufficiently to convert the nickel component of said catalyst to nickel aluminate, and disperse said nickel aluminate within the alumina support, without sintering said alumina support, and recycling said catalyst after contact with the oxygen-containing gas to the reaction zone to reduce the nickel aluminate component of the catalyst, and increase the activity of the catalyst vis-a-vis that of the catalyst initially withdrawn from the reaction zone.

19. The process of claim 18 wherein the coarse catalyst fraction is of average particle size diameter ranging from about 90 microns to about 200 microns.

20. The process of claim 18 wherein, after contact and treatment of the coarse catalyst fraction with the oxygen-containing gas and the nickel component is converted to nickel aluminate, the treated coarse catalyst fraction is contacted with an acid solution sufficient to dissolve and remove contaminants from the surface of said treated coarse catalyst fraction without dissolving the nickel aluminate, and the said treated coarse catalyst fraction is then recycled to the reaction zone.

21. The process of claim 20 wherein the coarse catalyst fraction is of average particle size diameter ranging from about 90 microns to about 200 microns.

22. The process of claim 11 wherein after withdrawal of the portion of catalyst from the reaction zone, and contact and treatment of same with an oxygen-containing gas to convert the nickel component of said catalyst to nickel aluminate, the catalyst is classified in fractions according to size, including a coarse fraction wherein the average particle size diameters are greater than about 90 microns, the coarse fraction is contacted and treated with the acid fraction, and the acid treated coarse fraction thereafter recycled to the reaction zone.

* * * * *